United States Patent Office 2,830,007
Patented Apr. 8, 1958

2,830,007

TRIFLUOROETHYL VINYL ETHER COMPOSITIONS AND METHODS FOR PREPARING AND USING THE SAME

Julius G. Shukys, Chatham Township, Morris County, N. J., assignor to Air Reduction Company, Incorporated, New York, N. Y., a corporation of New York No Drawing Application May 27, 1953
Serial No. 357,901

8 Claims. (Cl. 167—52)

This invention relates to the novel compound 2,2,2-trifluoroethyl vinyl ether and to the method for producing the same. The invention includes anesthetic compositions and methods wherein 2,2,2-trifluoroethyl vinyl ether comprises an essential active agent or ingredient. The compound can be represented by the following formula:

$$F_3C \cdot CH_2 - O - CH = CH_2$$

The new ether is useful as an inhalant anesthetic. A serious disadvantage of the commonly employed inhalant anesthetics is the danger of explosion during administration. 2,2,2-trifluoroethyl vinyl ether is more resistant to explosion. It, accordingly, considerably reduces the danger of explosion during administration and can be more safely employed in admixture with oxygen. The novel ether has been found to possess unusually high anethetic activity coupled with reduced explosiveness and absence of untoward side effects; it is capable of producing rapid, smooth, uneventful induction, with relative safety and easily controllable maintenance of anesthesia with a smooth emergence relatively free of undesirable phenomena.

The 2,2,2-trifluoroethyl vinyl ether in its highly purified form, free of toxic impurities, is administered by inhalation in admixture with oxygen, or in admixture with breathable life sustaining gaseous mixtures containing free oxygen, such as air, nitrous oxide-oxygen, etc. The usual techniques for administering volatile anesthetics for inhalation are employed. The level of narcosis is controlled by regulating the relative concentrations of the inspired mixture. The anesthetic composition herein described is considered to be most advantageous for use in humans, but it is applicable to animals as well. While it has been demonstrated to be unusually good for inhalation anesthesia in which the ether vapor is administered with a pharmaceutical vehicle such as oxygen, air, etc., it is possible to administer the ether in other ways such as rectally or intravenously, the ether being administered in such cases preferably with a pharmaceutical vehicle selected in accordance with the mode of administration, for example oil for rectal administration.

In general, 2,2,2-trifluoroethyl vinyl ether can be prepared by vinylation of 2,2,2-trifluoroethanol with acetylene in the presence of the corresponding alkali metal alcoholate, for example, potassium 2,2,2-trifluoroethanolate. In a preferred embodiment of the process, an excess of 2,2,2-trifluoroethanol is treated with an alkali metal, for example, potassium, in a suitable solvent, for instance, ethyl ether, and after the removal of the ether, the resulting reaction mixture, which contains both 2,2,2-trifluoroethanol and potassium 2,2,2-trifluoroethanolate is vinylated with acetylene. The 2,2,2-trifluoroethyl vinyl ether product thus obtained is preferably subjected to an acid wash and then fractionally distilled to substantially completely remove toxic and other impurities which might produce undesirable physiological effects. The ether must be substantially completely free of toxic and other impurities which might produce undesirable physiological effects in order to be suitable for anesthetic use.

The following example will serve to illustrate the preparation of the new ether.

EXAMPLE

2,2,2-trifluoroethanol (270 g.) was added slowly to a cooled suspension of potassium metal (15 g.) in ethyl ether (250 ml.) with stirring. When all the potassium metal had reacted, the resulting solution was fractionally distilled in order to remove the ethyl ether. The residue was placed in a bomb and the air was removed from the bomb by flushing with acetylene. The bomb was sealed and heated to 150° C. Acetylene was then introduced at 245–260 p. s. i. and the gas pressure was maintained for a period of 5 hours under mechanical agitation throughout the reaction. At the end of this time, heating was discontinued, the flow of acetylene was shut off and the bomb was allowed to cool to room temperature. The excess pressure in the bomb was reduced to atmospheric pressure by venting any gases through a Dry-Ice cooled trap.

The reaction mixture comprising 2,2,2-trifluoroethyl vinyl ether, 2,2,2-trifluoroethanol and potassium 2,2,2-trifluoroethylate was fractionally distilled, whereupon crude 2,2,2-trifluoroethyl vinyl ether was obtained which boiled at 42–45° C. at 760 mm. More 2,2,2-trifluoroethyl vinyl ether was obtained when the distillation residue was returned to the bomb and reacted with acetylene in the same manner as hereinabove described.

The alkali metal hydroxides, instead of the alkali metals per se, can be employed to produce the alkali metal 2,2,2-trifluoroethanolate. However, this introduces water in the reaction mixture which requires removal prior to vinylation with acetylene.

The crude products, on further distillation, yielded 2,2,2-trifluoroethyl vinyl ether having a boiling point of 43.1° C. at 759 mm.; $d_4^{20} = 1.135$ and $n_D^{20} = 1.3198$. In experiments, the new compound readily induced anesthesia with no untoward side effects.

The ether product is preferably purified for anesthetic use by subsequently subjecting the ether obtained as described above to an acid wash. Thus the product is first washed with water, then washed with an aqueous solution of a mineral acid, after which it is washed with water followed by a wash with an aqueous solution of caustic alkali to remove the acid, and finally dried. The acid wash may be applied to the crude product (B. P. 42–45° C. at 760 mm.) or it may be applied to the product (B. P. 43.1° C. at 759 mm.) obtained upon the further fractional distillation of the crude described above. The washed and dried product is then fractionally distilled, the 2,2,2-trifluoroethyl vinyl ether fraction (B. P. 43° C. at 760 mm.) being collected separately in pure form substantially completely free of toxic and other impurities which are physiologically undesirable. The final product, particularly when prepared for anesthetic use, preferably contains a small amount of an alkaline agent as a stabilizer. Such agent tends to prevent hydrolysis during storage and reduces the chance of polymerization due to possible contact with small amounts of acidic contaminating material. Alkyl, cycloalkyl and aryl amines may be used such as phenyl-alpha-napthylamine, ortho-phenylene diamine, paraphenylene diamine, triethanolamine, di-(2-ethyl hexyl) amine, and dicyclohexylamine. The particular agent selected for use in the product intended for anesthetic purposes must be non-toxic and otherwise pharmaceutically acceptable. Phenyl-alpha-napthylamine is the preferred stabilizing agent. It is added to the 2,2,2-trifluoroethyl vinyl ether following preparation and purification thereof as described above.

The following is an example of an application of the acid wash purification and of the preparation of the final product in the purified and stabilized form preferred for anesthetic use.

377 grams of the crude 2,2,2-trifluoroethyl vinyl ether distillate (B. P. 42–45° C. at 760 mm.) obtained from the reaction mixture formed in the bomb, as described above, was stabilized with a small amount of phenyl-alpha-napthylamine. The stabilized ether was first washed with water (100 cc.) then with 100 cc. of diluted hydrochloric acid (concentrated hydrochloric acid in an equal volume of water) then with water (100 cc.) and finally with 100 cc. of an aqueous sodium hydroxide solution (20 cc. of 40% aqueous sodium hydroxide diluted with 80 cc. of water). The washing operations were performed by shaking the material to be washed with the washing agent in a separatory funnel. In each case the washed product was then separated from the immiscible washing solution. The washed ether was given a preliminary drying by agitation with sodium hydroxide pellets to remove the visible water droplets and then decanted from the pellets and dried over metallic sodium.

The dried material was initially distilled rapidly through a fractionating column in order to remove the high boiling impurities. The distillate was then stabilized with phenyl-alpha-naphthylamine and fractionally distilled. The fraction boiling at 43°/741 mm. and free of aldehyde and other impurities was collected separately and stabilized with phenyl-alpha-napthylamine (.01% by weight). The final product is 2,2,2-trifluoroethyl vinyl ether in purified and stabilized form, preferred for anesthetic use.

The anesthetic activity of 2,2,2-trifluoroethyl vinyl ether (hereinafter sometimes referred to more briefly as trifluoroethyl vinyl ether) has been studied in numerous pharmacological experiments. The following are examples of several of such types of tests:

*Experiment 1—Observation anesthesias.*—Four dogs 6 to 8 kgm. and one *Macacus rhesus* monkey 3 kgm. were anesthetized with trifluoroethyl vinyl ether.

A closed circuit anesthetizing machine was employed with a specially designed face mask. The anesthetic was introduced by insertion of a hypodermic needle through a rubber stopper in the face mask. The ether was administered with oxygen in a closed circuit. The technique was that described in an article entitled "The anesthetic action of cyclopropyl methyl ether" by John C. Krantz et al., published in the Journal of Pharmacology and Experimental Therapeutics, vol 69, No. 3, July 1940.

During induction, salivation was minimal and the bronchial tree remained quite free from mucus throughout the anesthesia. Surgical anesthesia was uneventful. Breathing was often sterterous, but deep and regular. Relaxation of the musculature of the abdomen and extremities was good. Occasionally an animal exhibited incoordinated leg movements during anesthesia. Pain reflexes were abolished sufficiently to permit surgical procedures in the abdominal area. Recovery from anesthesias of 15–20 minutes' duration occurred in 2 to 4 minutes. The recovery period was exceptionally tranquil. The quantities of trifluoroethyl vinyl ether employed were about equal to the quantities of ethyl ether required to produce comparable anesthetic syndromes.

*Experiment 2—Anesthetic index (dog).*—The dogs employed were fed a laboratory ration for several days, then fasted 6 hours prior to the experiment. The procedure was identical to that in the aforementioned article published in vol. 69, No. 3, of the Journal of Pharmacology and Experimental Therapeutics. The volume of the agent required to produce respiratory arrest was divided by the volume required to produce surgical anesthesia. The quotient was termed the anesthetic index. The results are shown in Table 1:

Table 1.—Anesthetic index

| Dog No. | Sex | Weight, kgm. | Induction, cc./kgm. | Respiratory Failure, cc./kgm. | Anesthetic Index |
|---|---|---|---|---|---|
| 1 | F | 9.5 | 0.58 | 1.53 | 2.64 |
| 2 | M | 8.4 | 0.65 | 1.49 | 2.27 |
| 3 | F | 6.3 | 0.63 | 1.67 | 2.63 |
| 4 | F | 5.3 | 0.86 | 2.17 | 2.30 |
| 5 | F | 6.1 | 0.98 | 2.21 | 2.25 |
| 6 | F | 5.4 | 0.74 | 1.67 | 2.25 |
| 7 | F | 7.4 | 0.68 | 1.35 | 2.00 |
| 8 | M | 6.8 | 0.74 | 1.47 | 2.00 |
| 9 | F | 6.9 | 0.72 | 1.74 | 2.40 |
| 10 | F | 12.0 | 0.58 | 1.62 | 2.79 |
| Mean | | | 0.72 | 1.69 | 2.35 |
| S. D. | | | 0.13 | 0.29 | 0.27 |
| C. V. | | | 18.10 | 17.20 | 11.50 |

The data in Table 1 indicate that trifluoroethyl vinyl ether exhibits a high potency and good margin of safety.

*Experiment 3—Blood pressure studies (dog).*—The effect of trifluoroethyl vinyl ether on the blood pressure was determined in the following manner. A dog was lightly anesthetized with ethyl ether. The blood pressure was recorded from the carotid artery. The respiratory tracings were recorded by a tambour connected to the trachea. The ethyl ether was removed from the container of the anesthetizing device and the animal was allowed to recover partially. Then trifluoroethyl vinyl ether was used. Quantities of trifluoroethyl vinyl ether were used to produce light and deep surgical anesthesia. Surgical anesthesia was allowed to proceed for one hour. The procedure was carried out on 5 dogs. It appeared that anesthesia with trifluoroethyl ether has no significant effect upon the blood pressure of the dog under these conditions. (This observation has been corroborated in clinical trial on human patients.)

*Experiment 4—Electrocardiographic studies (dog and monkey).*—Six dogs and one monkey were anesthetized with trifluoroethyl vinyl ether, and deep surgical anesthesia was maintained for 30 minutes. Electrocardiograms were made and compared with electrocardiograms made on the same animal under surgical anesthesia with ethyl ether. No significant abnormalities were observed. The electrocardiographic patterns under the two anesthetics were strikingly similar. In all animals each anesthetic produced an increase in the rate of the heart beat (as do most anesthetics).

In all of these dogs each anesthetic either flattened or inverted the T-wave. Neither appeared to produce this effect to a greater degree.

*Experiment 5—Electroencephalographic studies (dog and monkey).*—A dog and a monkey were anesthetized deeply with ethyl ether and electroencephalograms were taken from various areas of the brain. The animals were allowed to awaken and the procedure was repeated using trifluoroethyl vinyl ether as the anesthetic. No significant difference was observed between the electroencephalograms of the animals under the two anesthetics.

*Experiment 6—Blood chemistry studies (dog and monkey).*—Four dogs and one monkey were anesthetized with trifluoroethyl vinyl ether for 1 hour. Prior to anesthesia and immediately following anesthesia, blood samples were drawn for analysis. Twenty-four hours after anesthesia additional samples were taken from the dogs. Urea nitrogen, blood sugar and carbon dioxide-combining power did not change significantly after anesthesia. Hemoglobin percent red cell count and white cell count were likewise not significantly altered by the anesthesia.

*Experiment 7—Liver function tests (dogs).*—Four dogs were subjected to the bromsulfalein liver function test, as set forth in New and Nonofficial Remedies. Prior to and one hour after 60 minutes' anesthesia with trifluorethyl vinyl ether the test was carried out. After 24 hours the test was performed again. The percentage of dye excreted in all cases was not significantly different from that obtained prior to anesthesia (indicating the absence of liver toxicity).

*Experiment 8—Effect on the perfused heart (frog).*—Trifluoroethyl vinyl ether was dissolved in Howell-Ringer's solution and perfused through the frog's heart in situ. Solutions containing 100 mgm. percent produced a slight reduciton in amplitude of the beat and a moderate decrease in cardiac rate. Recovery was prompt when the anesthetic agent was removed from the perfusion fluid.

*Experiment 9—Effect on $O_2$ uptake of heart.*—Cardiac ventricular strips from the rat's heart were employed. Standard Warburg technic was used following the specific details of Pearson, Hastings and Bunting as reported in an article by them in the American Journal of Physiology, 158:251, 1949. Glucose was used as the substrate. The tissue was allowed to respire normally for 40 minutes. The data were calculated as percent $O_2$ uptake of the second period in terms of the $O_2$ uptake of the control period. In 15 experiments, after the addition of 50 mgm. percent of trifluoroethyl vinyl ether the percentage change in $O_2$ in the second period was 84.7±2.5; in 10 experiments without the ether the percentage change during the second period was 87.8±2.5. It was concluded that this concentration of the ether did not significantly affect the cardiac respiration under these conditions.

*Experiment 10—Delayed anesthetic reactions (rats).*—Twenty adult white rats were anesthetized with trifluoroethyl vinyl ether to the surgical level and maintained at this level for 30 minutes. The test animals were then isolated. Three animals were sacrificed at the end of 1 week. Three animals were sacrificed at the end of 2 weeks. No significant findings were observed upon histologic examination of the livers and kidneys. At the end of 4 weeks none of the remaining animals had died. All appeared to be in a healthy condition (thus showing there is no delayed toxic effect).

*Experiment 11—Histologic studies of liver and kidney (dog).*—Three dogs were anesthetized for 60 minutes each on three alternate days. On the fifth day after the first anesthesia the liver and one kidney were removed for histologic study. In no case were there significant histologic changes observed (indicating no acute toxic phenomena on the body vicera).

*Experiment 12.—Clotting time and hemolysis of blood (dog).*—The clotting time of blood was determined in 4 normal dogs by the capillary tube method. The average value was 1 minute. In the same animals under deep surgical anesthesia for 60 minutes the clotting time was again determined. There was no significant change in the clotting time of the blood in any of the dogs. The same experiment was performed on one *Macacus rhesus* monkey. The preanesthetic clotting time was 1 minute. It was not significantly altered by the anesthesia. Volumes of 10 cc. of trifluoroethyl vinyl ether in varying concentrations in normal salt solution, to which was added 0.1 cc. of defibrinated human blood, were maintained at 28° C. Twenty-five milligrams percent, 50 mgm. percent, 75 mgm. percent, 100 mgm. percent, 150 mgm. percent and 200 mgm. percent solutions produced no detectable hemolysis over a 24 hour observation period.

*Experiment 13—Preanesthetic medication (dogs).*—In 2 dogs inducing trifluoroethyl vinyl ether anesthesia with nitrous oxide-oxygen or cyclopropane-oxygen mixtures was uneventful. Preanesthetic medication with pentobarbital sodium or morphine was found to be compatible with trifluoroethyl vinyl ether anesthesia in 2 dogs.

*Experiment 14—Fluoride in blood (dogs).*—Three dogs were anesthetized with trifluoroethyl vinyl ether for a period of 2 hours. Samples of blood taken before anesthesia, 30, 60, 90 and 120 minutes after induction and 24 hours later, gave negative tests for fluoride. The test was made according to the method developed by Perce and Loevenhart J. Biol. Chem. 2:397, 1907. This indicated the absence of fluoride in the blood levels of 1 in 500,000.

The anesthetic agent trifluoroethyl vinyl ether is preferably administered by inhalation in admixture with at least one other constituent comprising oxygen in life-sustaining proportions. Thus, the ether is vaporized and mixed with oxygen (supplied either as pure oxygen or in air, etc.) to form a respirable gaseous inhalant anesthetic composition containing a sufficient proportion of the ether to produce the desired depth of anesthesia and a sufficient proportion of oxygen to sustain life. Where trifluoroethyl vinyl ether is used in said respirable gaseous mixture as the sole anesthetic agent (i. e., in the absence of other anesthetic agents such as nitrous oxide) it should be present in an amount exceeding about 1% by volume of the respirable gaseous mixture. The ether vapor and the oxygen may be premixed or mixed during administration to provide the desired proportion of the ether and oxygen in the lungs. The constituents of the anesthetic mixture may be varied in response to the temporary needs of the patient during anesthesia as indicated by certain physiological signs. As an example of effective concentrations of trifluoroethyl vinyl ether for anesthetic mixtures according to the present invention, the trifluoroethyl vinyl ether may be used in concentrations approximating those used in the administration of ethyl ether. (See Pharmacologic Principles of Medical Practice, Krantz and Carr, 1951.) Other gases or vapors, some having anesthetic activity in themselves such as nitrous-oxide, ethyl ether, cyclopropane, etc. may be administered with the trifluoroethyl vinyl ether if desired.

In performing an anesthesia with trifluoroethyl vinyl ether the liquid agent is preferably volatilized and inhaled with additional constituents forming an inhalation anesthetic composition as described above. The inhalation anesthetic may be administered by various techniques, for example; the open drop technique, in which the liquid agent is delivered in drops to a gauze or other porous absorbent through which air or oxygen is inspired carrying with it the ether vapors (known variations of this technique exist in which various types of masks and inhalers are utilized), or, the closed technique, involving several variations and different forms of apparatus which bear similarity mainly in that the vapors of the ether are confined and administered with a controlled atmosphere to form an inhalant anesthetic mixture which is then usually applied to the subject through a facemask device. The particular procedure or technique selected is dependent primarily upon individual preferences of the anesthetist or the peculiar needs of the surgical treatment involved depending upon the condition of the patient.

In the anesthetic procedure premedication may at certain times be prescribed. Tests have shown that preanesthetic medication with pentothal sodium and seconal sodium are compatible with trifluoroethyl vinyl ether anesthesia. The usual premedicants appear to be suitable for use with this agent.

The following are typical cases of several applications of trifluoroethyl vinyl ether in anesthetizing human subjects. These cases show trifluoroethyl vinyl ether to have unexpectedly high anesthetic potency.

CASE 1

A male subject was given a preanesthetic medication of an intramuscular injection of seconal sodium.

Trifluoroethyl vinyl ether was administered by the open drop method, the liquid agent being discharged from a container in the form of liquid droplets onto a gauze covered mask inhaler.

An initial administration in the order of two liquid droplets per second onto the gauze followed by a delivery in the order of one drop every second was made during induction. Surgical anesthesia was attained in about 32 seconds. Light anesthesia was continued for approximately six minutes. During this time trifluoroethyl vinyl ether in liquid form was applied in the form of droplets to the inhaler at the rate of about one drop every ten seconds.

Though the trifluoroethyl vinyl ether was administered during induction in substantially the same manner as would have been used with the ethyl ether, the induction period was unexpectedly short (32 seconds) as compared to the relatively long induction period that would have been required for ethyl ether anesthesia. The induction was smooth, rapid, free from struggling, coughing or straining.

The recovery was rapid and uneventful, the pulse was not significantly altered, and no irritation of the upper respiratory tract was observed.

CASE 2

The anesthetic agent was administered to a female patient who was undergoing rectal surgery. Pentothal sodium was administered intravenously as a preanesthetic medication and for induction. Anesthesia was maintained by administration of trifluoroethyl vinyl ether in the same manner as in the above example.

The relaxation was good; blood pressure, pulse, and respiration, were essentially not altered. The patient emerged from the anesthetic in excellent condition.

CASE 3

No surgical treatment was involved. A preanesthetic medication of 100 mgm. seconal was used. Trifluoroethyl vinyl ether was administered by the open drop method.

The induction period was approximately .8 of a minute. During induction anesthesia occurred smoothly, rapidly and with no apparent irritation. Transition to surgical anesthesia was smooth. Surgical anesthesia was maintained for 5 minutes. A total of 15 cc. of the liquid agent was utilized.

In post anesthesia the subject experienced no nausea and emergency was rapid.

CASE 4

The anesthetic was administered during surgical treatment involving a total abdominal hysterectomy. A premedication of morphine sulfate 1/6 grain and atropine sulfate 1/150 grain was used. Trifluoroethyl vinyl ether was administered by the open drop method.

The agent was administered at a gradually increasing rate to 50 drops per minute when the first plane of anesthesia was reached. The induction period was approximately 2¼ minutes. Transition to surgical anesthesia was smooth and rapid. Surgical anesthesia was maintained for approximately 30 minutes. During the final 10 minutes of anesthesia the patient was supplied with additional pure oxygen under the mask. A total volume of 50 cc. trifluoroethyl vinyl ether was utilized. Relaxation and other physiological signs in the patient were similar to those apparent in anesthesia with cyclopropane. In post anesthesia a relatively long period of analgesia was apparent in which the agent apparently had a sedative-like action.

CASE 5

The anesthetic agent was administered in conjunction with a surgical treatment involving a pelvic examination, dilatation of the cervix and drainage of a pelvic abcess. A premedication of morphine sulphate 1/6 grain and atropine sulphate 1/150 grain was used. The induction period was approximately 2¼ minutes and the agent was administered at a rate of 75 drops per minute. Induction was smooth and rapid and transition was easy and smooth to the extent that it was difficult to determine the exact time of transition. Surgical anesthesia was maintained for approximately 20 minutes and a total of 50 cc. of the agent was utilized.

CASES 6, 7, 8 AND 9

The anesthetic agent was administered to four subjects for tooth extractions. No preanesthetic medication was used. Administration was accomplished for two of the subjects by the "open drop" method and for the other two subjects by the Simplex Oro-nasal technique which is a semi-closed technique but not "closed circuit." Induction was approximately 1 minute duration. Excellent induction was obtained with smooth and rapid transition to the surgical plane of anesthesia. Surgical anesthesia was maintained for approximately 3 minutes and a total of 4 to 6 cc. of liquid agent was utilized for each case. A mixture comprising nitrous oxide (approximately 78%) with oxygen (approximately 22%) was utilized in admixture with the trifluoroethyl vinyl ether vapor during anesthesia with the Simplex Oro-nasal technique. Depth of anesthesia was controlled by varying the concentration of the trifluoroethyl vinyl ether. Emergence from anesthesia was rapid although the patient was slow to regain total emergence. The exact concentration of the ether was unknown but probably not over 1½%.

This application definitely indicates the trifluoroethyl vinyl ether to be an excellent supplement to nitrous oxide.

CASE 10

The anesthetic agent was administered for a surgical treatment involving a hemorrhoidectomy. A preanesthetic medication of morphine sulfate 1/6 grain and atropine sulfate 1/150 grain was used. Trifluoroethyl vinyl ether was administered by the open drop method.

Pentathol was used for induction. Thereafter trifluoroethyl vinyl ether was administered for a period of 15 minutes to maintain anesthesia. A total of 15 cc. of the liquid agent was utilized. In post anesthesia the condition of the patient was excellent with no nausea or vomiting. The patient awoke in a short time.

The anesthetist in charge of the above cases reported that the drug in many ways resembles one of the favorite anesthetics, cyclopropane, and that it is in some ways superior to cyclopropane. Comparatively, trifluoroethyl vinyl ether is superior to cyclopropane with respect to the regulation of the planes of anesthesia, with respect to the recognition of the signs of anesthesia and in providing better relaxation. In addition, of course, it is safer from many aspects, especially explosibility. Further, it may easily, simply, and relatively safely be administered with a minimum of equipment and supplies by the simple admixture with air.

SAFETY

Trifluoroethyl vinyl ether shows a greater margin of safety against the danger of explosion in inhalation anesthesia than the other known inhalation anesthetic agents that can be used for deep surgical anesthesia with good muscular relaxation. It has been found that the lower limit of flammability of trifluoroethyl vinyl ethyl vapor in oxygen or air is higher than the flammability limits in oxygen or air of other inhalant anesthetics capable of giving deep surgical anesthesia. For example, the value for the lower flammability limit of trifluoroethyl vinyl ether vapor determined by the standard method adopted by the United States Bureau of Mines was 3% and that of ethyl vinyl ether 2.1%. The lower flammability limit of diethyl ether obtained by the same method is reported to be 1.9%. Thus with trifluoroethyl vinyl ether greater concentrations of the anesthetic agent are possible without danger of exposion. Further, because of high potency much less of the agent is required to induce analgesia, therefor the danger of forming an explosive mixture is less. It is believed that the danger of explosion in the zone surrounding the face mask or point of administration and elsewhere externally of the anesthetic apparatus, particularly, will be materially reduced by the use of trifluoroethyl vinyl ether.

It will be readily apparent from the foregoing description that the present invention provides novel compositions and methods having significant advantages particularly for anesthetic purposes.

This application is a continuation-in-part of my co-pending application, Serial No. 290,582, filed May 28, 1952, now abandoned.

I claim:

1. A process which comprises reacting 2,2,2-trifluoroethanol with acetylene in the presence of an alkali metal 2,2,2-trifluoroethanolate so as to produce 2,2,2-trifluoroethyl vinyl ether.

2. An inhalant anesthetic mixture characterized by high anesthetic activity coupled with reduced explosiveness and absence of untoward side effects comprising 2,2,2-trifluoroethyl vinyl ether in admixture with oxygen.

3. The method which comprises administering to a human patient a respirable composition comprising essentially oxygen gas and 2,2,2-trifluoroethyl vinyl ether, the said oxygen being in a proportional amount substantially proper for respiratory purposes, and continuing said administration until a state of anesthesia is induced in said patient.

4. A volatile anesthetic agent for the production of anesthesia in man consisting essentially of highly purified liquid 2,2,2-trifluoroethyl vinyl ether free of toxic impurities and containing a stabilizing amount of a non-toxic, pharmaceutically acceptable alkaline stabilizing agent for maintaining said ether in said highly purified form from the time of manufacture thereof until use as an anesthetic agent.

5. A respirable gaseous anesthetic mixture comprising essentially oxygen and 2,2,2-trifluoroethyl vinyl ether, said oxygen being present in a proportional amount substantially proper for respiratory purposes and said ether being present in a proportional amount exceeding about 1% by volume of the respirable gaseous mixture and substantially proper for the induction of anesthesia in man.

6. A gaseous composition for the production of anesthesia in man comprising 2,2,2-trifluoroethyl vinyl ether and oxygen as essential active ingredients, said ether being present in an amount not less than about 1 percent by volume and said oxygen being present in an amount not less than about 20 percent by volume.

7. An inhalation anesthetic comprising essentially 2,2,2-trifluoroethyl vinyl ether, nitrous oxide, and oxygen.

8. The method which comprises administering 2,2,2-trifluoroethyl vinyl ether to a human patient in an amount and at a rate which will establish and maintain a concentration of said ether in the blood stream of said patient sufficient to render said patient substantially insensible to pain.

References Cited in the file of this patent

UNITED STATES PATENTS

| | | |
|---|---|---|
| 1,959,927 | Reppe | May 22, 1939 |
| 2,404,700 | Evans | July 23, 1946 |
| 2,406,674 | Evans | Aug. 27, 1946 |
| 2,452,944 | McBee | Nov. 2, 1946 |
| 2,425,755 | Roberts | Aug. 19, 1947 |
| 2,472,084 | Beller | June 7, 1949 |
| 2,482,725 | Bramwyche et al. | Sept. 20, 1949 |
| 2,537,643 | Eberley | Jan. 9, 1951 |
| 2,682,527 | Dickey | June 29, 1954 |

OTHER REFERENCES

Goodman et al.: Pharmacol. Basis of Therapeutics, 1st ed., 1941, Macmillan Co., New York, N. Y., pp. 51–53 and 72–75 pert.

Hibbert: J. Am. Chem. Soc., vol. 51, p. 1554 (1929).

Schildknecht et al.: Ind. and Eng. Chem., vol. 39, February 1947, pp. 180–186 (7 pp.).

Robbins: J. Pharmacol., vol. 86 (1946), pp. 197–204.

New and Nonofficial Remedies (1952), pp. 26 and 27.